United States Patent
Frelich et al.

(10) Patent No.: US 8,249,947 B2
(45) Date of Patent: Aug. 21, 2012

(54) VEHICLE SEAT COMPONENT SELECTION SYSTEM

(75) Inventors: Jeffrey Joseph Frelich, Commerce, MI (US); Terri L. Tahnoose, W. Bloomfield, MI (US); Lisa Samartino, Beverly Hills, MI (US); James J. Ryan, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 357 days.

(21) Appl. No.: 12/432,884

(22) Filed: Apr. 30, 2009

(65) Prior Publication Data

US 2010/0280875 A1    Nov. 4, 2010

(51) Int. Cl.
- *G06Q 30/00* (2012.01)
- *G06Q 10/00* (2012.01)
- *A47C 1/14* (2006.01)
- *A47C 4/28* (2006.01)
- *A47C 15/00* (2006.01)
- *A47C 7/02* (2006.01)
- *G06F 3/00* (2006.01)

(52) U.S. Cl. .............. 705/26.5; 297/351; 297/452.1; 297/452.28; 715/745; 705/26.1; 705/27.1; 705/28

(58) Field of Classification Search ............... None
See application file for complete search history.

(56) References Cited

U.S. PATENT DOCUMENTS

| | | | |
|---|---|---|---|
| 5,063,506 A | 11/1991 | Brockwell et al. | |
| 5,255,207 A | 10/1993 | Cornwell | |
| 5,570,291 A | 10/1996 | Dudle et al. | |
| 5,963,953 A * | 10/1999 | Cram et al. | 1/1 |
| 6,199,252 B1 * | 3/2001 | Masters et al. | 29/91.1 |
| 6,477,518 B1 | 11/2002 | Li et al. | |
| 6,813,610 B1 | 11/2004 | Bienias | |
| 6,859,768 B1 | 2/2005 | Wakelam et al. | |
| 6,901,377 B1 | 5/2005 | Rosenfeld et al. | |
| 6,917,907 B2 | 7/2005 | Hsi et al. | |
| 7,043,324 B2 | 5/2006 | Woehler | |
| 7,065,420 B1 | 6/2006 | Philpott et al. | |
| 7,283,884 B2 | 10/2007 | Walters | |
| 7,319,991 B2 | 1/2008 | Boutault | |
| 7,330,856 B2 | 2/2008 | Nicastro et al. | |
| 7,353,144 B1 | 4/2008 | Rinks et al. | |

(Continued)

OTHER PUBLICATIONS

John Holusha, "Making the Shoe Fit, Perfectly;Companies Use Technology to Sell to a Market of One", Mar. 20, 1996, NY Times, available at http://www.nytimes.com/1996/03/20/business/making-shoe-fit-perfectly-companies-use-technology-sell-market-one.html. *

*Primary Examiner* — Ryan Zeender
*Assistant Examiner* — Allen Chein
(74) *Attorney, Agent, or Firm* — MacMillan, Sobanski & Todd, LLC

(57) ABSTRACT

A vehicle seat component selection system includes a showroom having a vehicle seat component display and a touch screen terminal for input of customer data such as vehicle identification, vehicle assembly location and vehicle assembly volume. The terminal has access to a vehicle seat component database which defines characteristics of each component, such as sourcing location, cost, and compatibility with other components. A customer seat selection report is created by selecting components from the database, with a signal provided in the event incompatible components are selected. The terminal graphically displays the components as they are selected, and indicates a price range for the seat assembly as it is being proposed.

20 Claims, 5 Drawing Sheets

U.S. PATENT DOCUMENTS

| | | |
|---|---|---|
| 7,428,441 B2 | 9/2008 | Walters |
| 7,447,616 B2 | 11/2008 | Wang et al. |
| 2003/0004768 A1 | 1/2003 | Bury et al. |
| 2004/0122691 A1* | 6/2004 | Lupp et al. ......................... 705/1 |
| 2006/0168573 A1* | 7/2006 | Clark et al. .................. 717/140 |
| 2006/0271393 A1* | 11/2006 | Lopez et al. ....................... 705/1 |
| 2007/0156540 A1* | 7/2007 | Koren et al. ..................... 705/26 |
| 2008/0262980 A1* | 10/2008 | Weiss et al. ................... 705/500 |
| 2009/0053974 A1* | 2/2009 | Domm et al. .................. 446/454 |
| 2009/0063172 A1* | 3/2009 | Thomas et al. ................... 705/1 |
| 2009/0144070 A1* | 6/2009 | Psota et al. ........................ 705/1 |

* cited by examiner

FOAM

FIG. 8

MECHANISMS - RECLINERS

RECLINERS MANUAL → CONTINUOUS OR DISCONTINUOUS

RECLINERS POWER → CONTINUOUS OR DISCONTINUOUS

FIG. 9

VEHICLE SEAT COMPONENT SELECTION SYSTEM

BACKGROUND OF THE INVENTION

This invention pertains generally to vehicle seat assemblies and more particularly to vehicle seat component selection.

Seats for use in automotive and truck vehicles vary in style, size, shape, and other features. Seat designs vary from simple to complex, with numerous options available for even simple or basic seat assemblies for frame construction, power or manual movement, upholstery, etc. All of the options for the various seat components and features (used interchangeably herein) result in thousands of combinations of possible seat assemblies available to a vehicle manufacturer. In addition, global sourcing of vehicle seat component adds another layer of options available to a vehicle manufacturer.

Vehicle seat selection decisions at present typically are made by starting with what was used in the past. This significantly reduces the creativity and often results in unnecessary cost. Cost of the seat assembly, while a major factor, sometimes is not fully considered until the seat assembly feature selection process is complete.

The seemingly limitless choices available create customer confusion which needs to be alleviated.

BRIEF SUMMARY OF THE INVENTION

This invention alleviates many of the problems associated with past vehicle seat selection methods by providing a system for educating potential customers and gauging a level of interest in purchasing a vehicle seat assembly or subassembly. The system preferably includes a showroom having a vehicle seat component display and a touch screen terminal for input of customer data such as vehicle identification, vehicle assembly location and vehicle assembly volume.

The terminal has access to a vehicle seat component database which defines characteristics of each component. Characteristics may include component sourcing location, cost, and compatibility with other components.

The system includes the creation of a customer seat selection report by selecting components from the database, with a signal provided in the event any incompatible components are selected.

Preferably the terminal graphically displays the components as they are selected, and indicates a price range for the components and the assembly as it is being proposed.

BRIEF DESCRIPTION OF THE DRAWINGS

FIGS. 6-11 are examples of vehicle seat component selection screens.

DESCRIPTION OF PREFERRED EMBODIMENTS OF THE INVENTION

Figure 1:
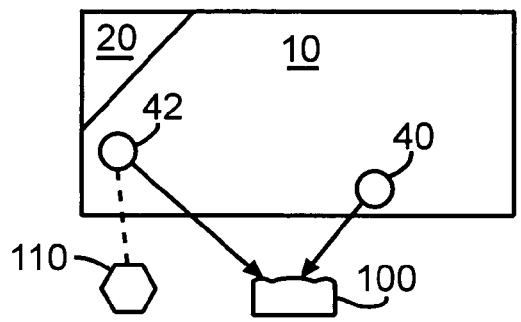
FIG. 1 is a schematic plan view of a showroom utilizing a system in accordance with the present invention.

Referring to FIG. 1, a showroom 10 includes a vehicle seat component display area 20 which typically includes samples of vehicle seat components such as seat structural components. Showroom 10 includes a computer terminal 40 which is capable of entering customer information into a customer seat selection report 100 as will be described later.

Showroom 10 also includes a computer terminal 42 associated with the display area 20 and which is capable of communication with vehicle seat component database 110 either by direct link of preferably over the internet using appropriate security measures. Of course, terminal 42 could be used as well for entering customer information into a customer seat selection report 100.

Figure 2:
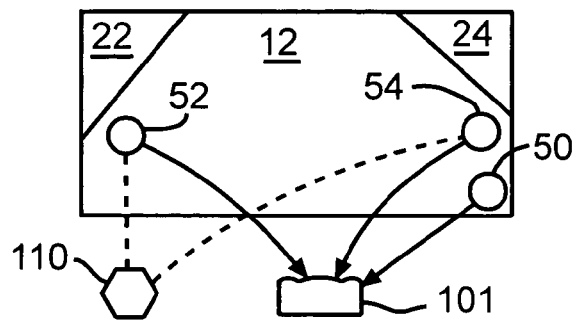
FIG. 2 is a schematic plan view of a second embodiment of a showroom utilizing a system in accordance with the present invention.

FIG. 2 illustrates a showroom 12 which includes vehicle seat component display areas 22, 24, each of which includes samples of different vehicle seat components. For example, display area 22 may include samples of seat adjusters, while display area 24 may include samples of seat fabric options. Showroom 12 includes a computer terminal 50 which is capable of entering customer information into a customer seat selection report 101.

Showroom 12 also includes a computer terminal 52 associated with display area 22 and another a computer terminal 54 associated with display area 24. Both terminals 52 and 54 are capable of communication with vehicle seat component database 110 either by direct link of preferably over the internet using appropriate security measures. Of course, terminals 52 and 54 could be used as well for entering customer information into a customer seat selection report 101.

Figure 3:
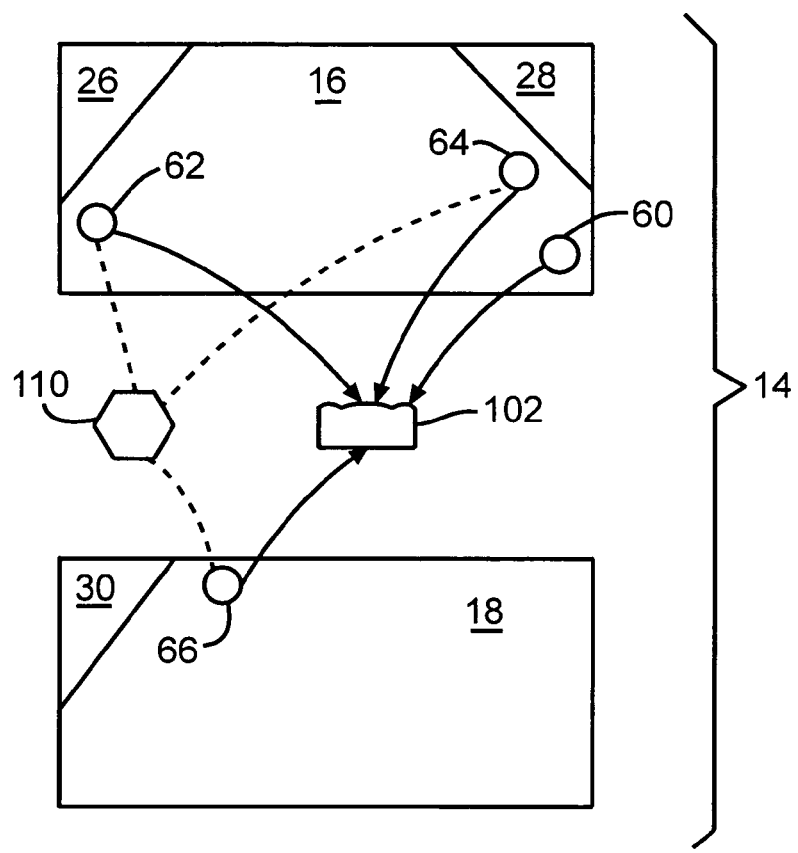
FIG. 3 is a schematic plan view of a third embodiment of a showroom utilizing a system in accordance with the present invention.

FIG. 3 illustrates a showroom 14 which includes two distinct rooms 16 and 18 which may be remotely located from each other. Rooms 16 and 18 may be located in the same building or in different countries or even different continents.

Room 16 includes vehicle seat component display areas 26, 28, each of which includes samples of different vehicle seat components (similar to showroom 12). Room 16 includes a computer terminal 60 which is capable of entering customer information into a customer seat selection report 102.

Room 16 also includes a computer terminal 62 associated with display area 26 and another a computer terminal 64 associated with display area 28. Both terminals 62 and 64 are capable of communication with vehicle seat component database 110 either by direct link of preferably over the internet using appropriate security measures. Of course, terminals 62 and 56 could be used as well for entering customer information into a customer seat selection report 102.

Room 18 includes a vehicle seat component display area 30 which includes samples of vehicle seat components different than those vehicle seat components in display areas 26 and 28. Room 18 includes a computer terminal 66 associated with display area 30 and capable of communication with vehicle seat component database 110 either by direct link of preferably over the internet using appropriate security measures.

Figure 4:
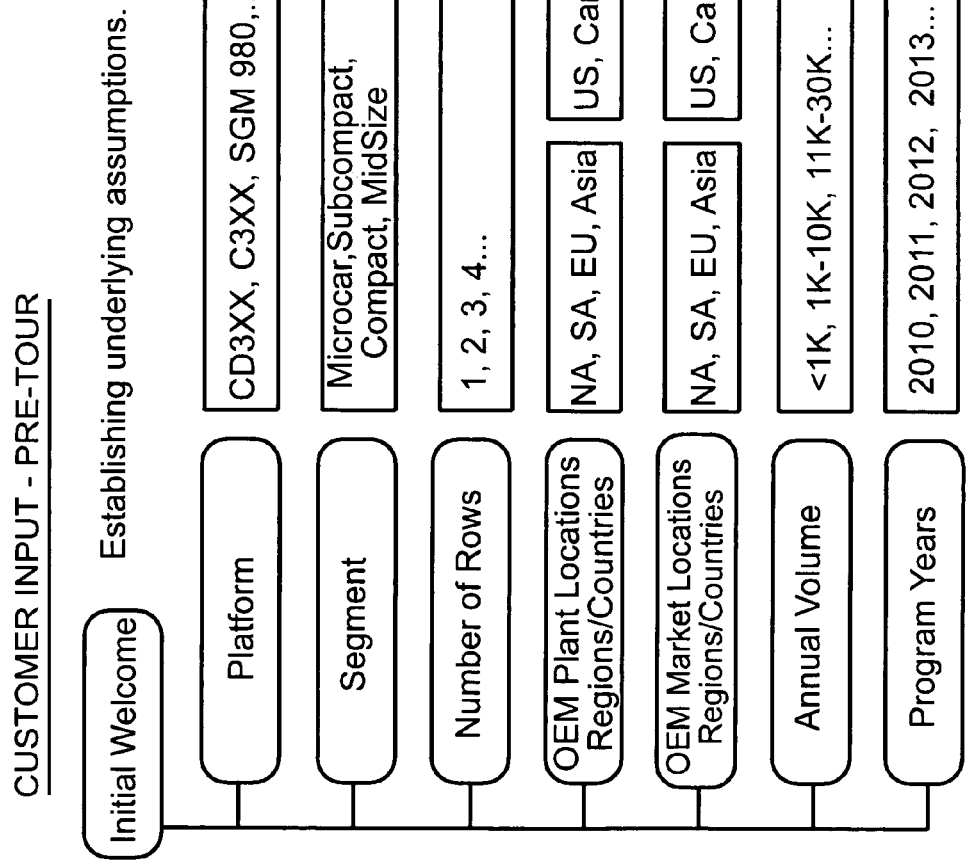
FIG. 4 is an example of an input screen for customer data
Figure 7:
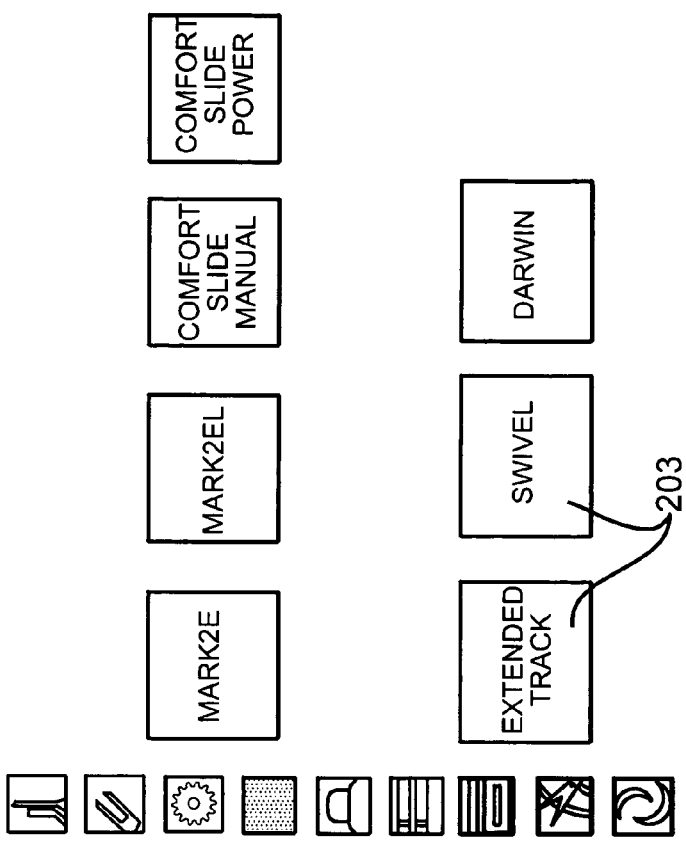
Figure 6:
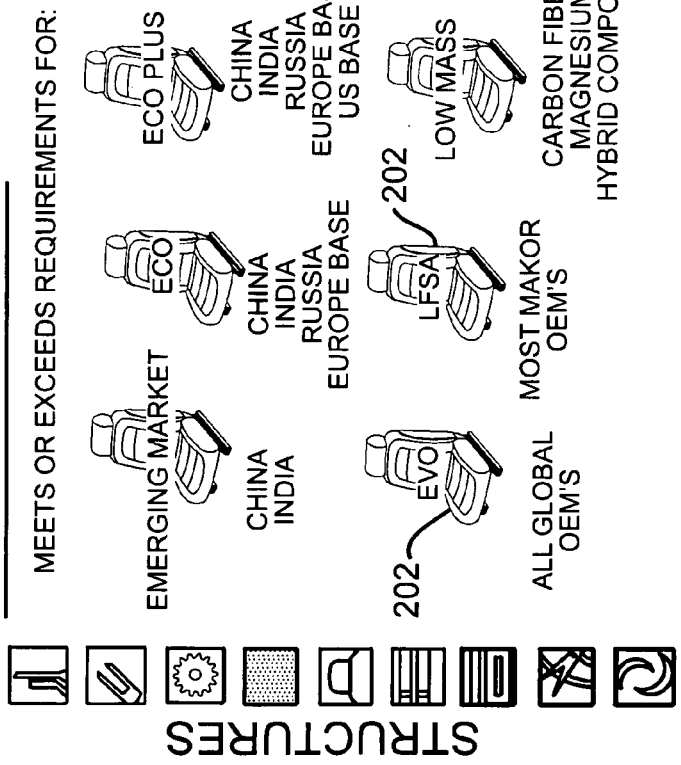

The present invention operates similarly for the embodiments of FIGS. 1-3. Preferably, a customer seat selection report 100, 101, 102 is initiated using computer terminal 40, 50, or 60 (although other terminals may be used as mentioned above). Terminals 40, 50, 60 for submitting customer vehicle information are not required to be located in any showroom, but may be located anywhere. Initial information input into the customer seat selection report preferably includes a particular customer vehicle for which the customer wishes seat information. FIG. 4 illustrates a sample initial screen for input of customer vehicle data. Each category includes numerous subcategories under which detailed information is gathered. The vehicle information should be as detailed as possible, including the vehicle manufacturer, the model, the style, the number of rows of seats, the vehicle assembly location, the vehicle use locations, estimated annual vehicle production volumes, and program duration, including the launch date. Certain data, such as annual vehicle production volume, may be provided within given ranges rather than a specific numerical estimate.

Overview of the Vehicle Component Selection System

After the basic customer vehicle information is entered into the customer seat selection report 100, 101, 102, seat component selection may begin. Preferably a customer will be taken to a display area such as 22, 24, 26, 28, or 30. After reviewing the display area, seat component input is made from a nearby terminal 42, 52, 54, 62, 64, 66 which accesses the customer seat selection report 100, 101, 102.

Figure 5:
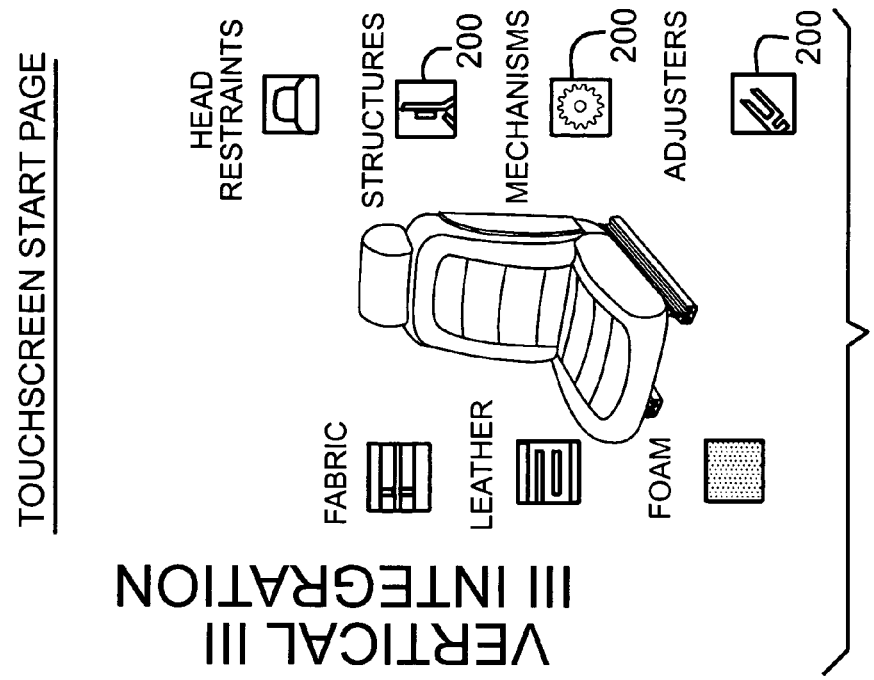
FIG. 5 is an example of a start screen for a customer seat selection report.

FIGS. 5-11 illustrate sample screens of computer terminals 42, 52, 54, 62, 64, and 66. FIG. 5 shows a starting point screen depicting several top level component classifications 200 such as structures, seat adjusters, recliner mechanisms, foam, head restraints, etc. When a top level vehicle seat component category 200 is selected, the next screen will show numerous first level categories 202, 203, 204, 205 as illustrated in FIGS. 6-9. As selections are made from these screens, second level screens showing additional categories may appear, or final features or components may appear for selection, thereby creating a decision tree until the final feature or component is selected for each category or subcategory.

Figures 10, 11:
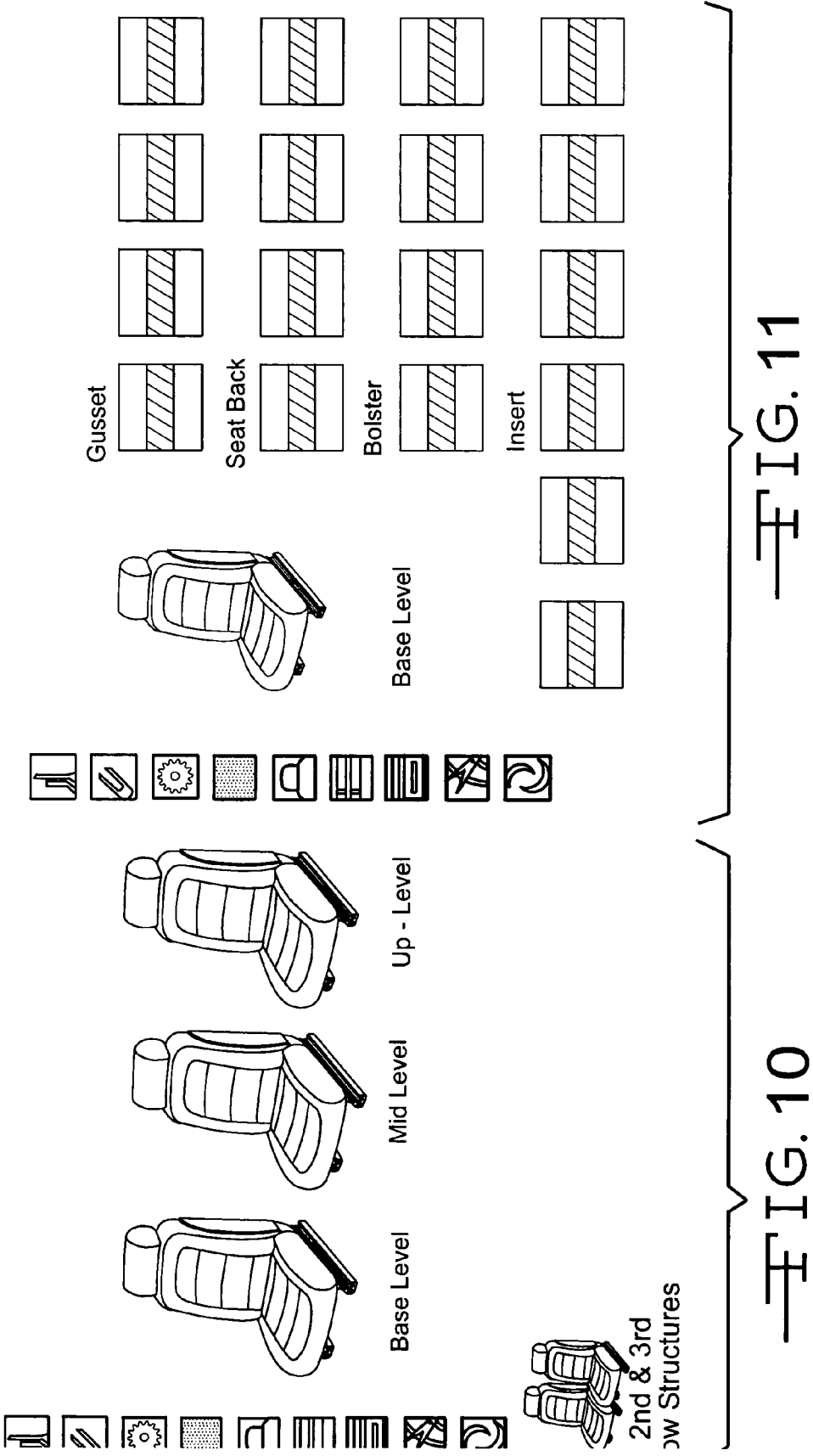

FIGS. 10-11 illustrate further examples of first and second level categories. FIG. 10 illustrates a first level category for material selection. The first level choice is a Base Level, a Mid Level, or an Up-Level. FIG. 11 is a sample second level screen setting forth the choices available under the Base Level category. Each of the options set forth on the second level screen of FIG. 11 provides additional choices or options which will appear on a third level screen (not shown). Many of the initial categories have numerous subcategories so that there may be multiple levels in the decision tree before a feature or component is selected.

It is preferred that the customer begins with the seat structural components, but this is not essential. The system is effective regardless of the starting point. For example, a customer may have a primary need for heated seats and may chose that feature initially so as not to select other components which may be incompatible with heated seats. However, in any event, even selecting the most desired component or feature last can be accommodated with this system, as this will merely require backtracking and changing any incompatible components, as will be discussed in more detail. It also is possible to begin component selection before customer vehicle information is entered, but this is not preferred.

Operation of the Vehicle Component Selection System

After drilling down into the database 110 through the various classifications and categories, ultimately the user will reach a screen in which the choice of a first feature or component is to be made. At that time a first seat component is selected from the seat component database for entry into the customer seat selection report. The database 110 determines whether the first seat component is compatible with the basic vehicle information in the customer seat selection report 100, 101, 102. If the first vehicle seat component is compatible, it is accepted into the vehicle customer seat selection report. If it is incompatible, a message will appear on the screen to this effect and an adjustment must be made, such as changing the first vehicle seat component selected or modifying the vehicle information initially submitted. Typically, it is more desirable to modify the vehicle seat component selected than the initial vehicle information.

Once a first vehicle seat component is selected and accepted, a second seat component will be selected from the seat component database 110. The second component may be from a subcategory of the same classification as the first vehicle seat component, or may be from a totally separate first level classification. Once the second vehicle seat component is selected, it will be determined from the database 110 whether the second vehicle seat component is compatible with both the basic vehicle information the first accepted seat component. The second vehicle seat component will be accepted into the vehicle customer seat selection report 100, 101, 102 if it is compatible with both the basic vehicle information and the first accepted seat component.

If the second seat component is incompatible with either the basic vehicle information of the first accepted vehicle seat component and is to be included in the customer seat selection report, a screen message will appear to this effect and an adjustment must be made, such as changing the second vehicle seat component selected or changing the first vehicle seat component selected or modifying the vehicle information initially submitted.

This process continues until all or a desired number of vehicle seat components are selected.

Costs

One of the benefits of this invention is the capability to indicate a running total of the cost of the selected and accepted vehicle seat components. Preferably, the cost of each selected component is displayed at the time of its selection, as well as the running total of the entire seat assembly or subassembly.

Costs of each component are given in a range due to various factors. For example, the cost of a selected vehicle seat structure may change if the later selected components are sourced from a different location than the seat structure, thereby adding freight, shipping insurance and possibly customs and duties. As another example, the price of leather upholstery may change if subsequent selection of color, stitching, perforations, embroidery is selected which requires a higher grade.

Costs may include not only manufacturing costs, but, in the event components must be shipped to another location for assembly, packaging, shipping, insurance, freight, customs and duties for each delivery location. The system may include a maximum or target cost initially to work toward.

User Interface

A visual representation of the selected vehicle seat components as they would fit into an overall seat assembly or subassembly is important for customer understanding and education. For this reason, it is preferred that each terminal have the capability of graphically illustrating the selected components. After each vehicle seat component is selected, the assembly is shown with that feature or component added. Of course, color illustrations are important for depicting ornamental features such as fabric and upholstery. As mentioned above, touch screen input is user friendly and aids in customer understanding and education.

Database factors

The database 110 includes hundreds of vehicle seat components and features. For example, the Structures classification may include options for materials used, mass, space, noise, ease of assembly into a vehicle, etc. The Recliner classification may include numerous manual and power options. The Upholstery classification may include options for patterns, multiple fabrics, inserts, seams, grade, color and ornamental features such as embroidery. Each component and feature preferably is identified with a manufacturing or sourcing location, and supply capacity at each location.

In addition, the database may include components sourced from organizations other than the organization operating the system. These may include subsidiary, affiliate, supplier or even competitor organizations.

Certain laws and regulations for vehicle seats and vehicle seat components in of particular jurisdictions are recognized by the database 110. For example, certain structures may be acceptable in some countries but may not be robust enough to meet standards in other countries. These laws and regulations are considered regarding compatibility of vehicle seat components selected for customer seat selection reports.

The system is preferably web based so that the database can be updated from any location worldwide and the terminals can access the database in real time and from any location worldwide.

The embodiments of the invention which have been illustrated and described are not intended to depict all forms of the invention, as various modifications may be made without departing form the spirit and scope of this invention as defined in the following claims.

What is claimed is:

1. A method for educating potential customers and gauging a level of interest in purchasing a vehicle seat assembly or subassembly, the method comprising:

providing a showroom including a first physical seat component display including physical seat components and a second physical seat component display, the second seat component display including physical seat components different than the physical seat components of the first seat component display;

providing a vehicle seat component database defining characteristics of various seat components, including the components of the first and second seat component displays;

creating a customer seat selection report for a particular vehicle, the report including basic vehicle information;

providing a first terminal in the showroom adjacent the first seat component display for input of customer data associated with the first seat component display into the report;

providing a second terminal in the showroom adjacent the second seat component display for input of customer data associated with the second seat component display into the report;

connecting the first and second terminals to the seat component database, entering a first seat component of the first seat component display from the seat component database into the report from the first terminal;

determining whether the first seat component is compatible with the basic vehicle information;

accepting the first seat component into the vehicle report if the first seat component is compatible with the basic vehicle information;

entering a second seat component of the second seat component display from the seat component database into the report from the second terminal;

determining whether the second seat component is compatible with both the basic vehicle information and the first accepted seat component;

accepting the second seat component into the vehicle report if the second seat component is compatible with both the basic vehicle information and the first accepted seat component;

signaling that a change must be made to the basic vehicle information or the first accepted seat component if the second seat component is incompatible with either the basic vehicle information or the first accepted vehicle seat component and is to be included in the report.

2. The method as defined in claim 1 wherein the basic vehicle information includes identification of a vehicle, an assembly location for the vehicle, and a vehicle manufacturing volume estimate at the vehicle assembly location.

3. The method as defined in claim 2 wherein the vehicle seat component database characteristics include costs, and wherein the system further comprises calculating the total cost of the seat assembly or subassembly seat components selected after each seat component is accepted.

4. The method as defined in claim 3 wherein the vehicle seat component database characteristics include vehicle seat row.

5. The method as defined in claim 3 wherein the vehicle seat component database characteristics include seat component manufacturing locations.

6. The method as defined in claim 5 wherein the vehicle seat component database characteristics include seat component production volume capabilities at each seat component manufacturing location.

7. The method as defined in claim 6 wherein the vehicle seat component database characteristics include compatibility with vehicle assembly locations.

8. The method as defined in claim 7 wherein the vehicle seat component database characteristics include cost estimates for delivery of the seat components to location for manufacturing the seat assembly or subassembly, the delivery costs including shipping and taxes.

9. The method as defined in claim 1 wherein the vehicle seat component database characteristics include at least one vehicle use jurisdiction, and wherein the vehicle seat component database characteristics include compatibility of the seat components with the laws and regulations of various jurisdictions.

10. The method as defined in claim 1 wherein the report includes a maximum target cost.

11. The method as defined in claim 1 wherein the first seat component is a seat frame.

12. The method as defined in claim 1 wherein the first seat component is a seat component other than a seat frame.

13. The method as defined in claim 1 wherein the vehicle seat component database includes data for seat components available from various organizations.

14. The method as defined in claim 1 wherein the vehicle seat component database is periodically updated and connectable to the terminal in real time.

15. The method as defined in claim 1 wherein a visual display of the seat assembly is made at the terminal after each seat component is accepted.

16. The method as defined in claim 1 wherein the terminal utilizes touch screen input.

17. The method as defined in claim 1 wherein a seat assembly or subassembly is manufactured using the accepted seat components.

18. The method as defined in claim 1 wherein the showroom comprises a first room and a second room at a location remote from the first room, the first room including the first seat component display and the first terminal, the second room including the second seat component display different than the first vehicle seat component display and the second terminal.

19. A vehicle seat component showroom comprising:
- a first physical vehicle seat component display including physical seat components and a second physical seat component display, the second seat component display including physical seat components different than the physical seat components of the first seat component display;
- a vehicle seat component database defining characteristics of various vehicle seat components, the characteristics including compatibility with other vehicle seat components;
- a database for accessing a customer seat selection report for a particular vehicle, the report including basic vehicle information;
- a first terminal located a first distance from with the first seat component display and a second distance from the second seat component display, the first distance being less than the second distance, the first terminal for (a) entering a first vehicle seat component of the first seat component display from the vehicle seat component database to be included in the report, (b) signaling whether the first vehicle seat component is compatible with the basic vehicle information, (c) accepting the first vehicle seat component into the vehicle report if the first vehicle seat component is compatible with the basic vehicle information, and (d) signaling that a change must be made to the basic vehicle information if the first vehicle seat component is incompatible and is to be included in the report,
- a second terminal located a third distance from the second seat component display and a fourth distance from the first seat component display, the third distance being less than the fourth distance, the second terminal for (a) entering a second vehicle seat component of the second seat component display from the seat component database to be included in the report, (b) signaling whether the second vehicle seat component is compatible with the basic vehicle information and the first accepted vehicle seat component, (c) accepting the second vehicle seat component into the vehicle report if the second vehicle seat component is compatible with the basic vehicle information and the first vehicle seat component, and (d) signaling that a change must be made to the basic vehicle information or the first vehicle seat component selected if the second vehicle seat component is incompatible and is to be included in the report.

20. The showroom as defined in claim 19 wherein said showroom comprises a first room including the first vehicle component display and a second room at a location remote from the first room, the second room including a display of a second vehicle seat component, and wherein a second terminal is provided in the second room for input of customer data into the report.

* * * * *